(12) United States Patent
Travitzky et al.

(10) Patent No.: US 7,867,313 B2
(45) Date of Patent: Jan. 11, 2011

(54) POROUS β-SIC-CONTAINING CERAMIC MOLDED ARTICLE COMPRISING AN ALUMINUM OXIDE COATING, AND METHOD FOR THE PRODUCTION THEREOF

(75) Inventors: Nahum Travitzky, Nuremberg (DE); Daniel Galsterer, Erlangen (DE); Peter Greil, Weisendorf (DE); Thomas Wolff, Munchberg (DE); Heino Sieber, Ingolstadt (DE); Lars Weisensel, Johannesberg (DE)

(73) Assignee: Helsa-Automotive GmbH & Co. KG, Gefrees (DE)

( * ) Notice: Subject to any disclaimer, the term of this patent is extended or adjusted under 35 U.S.C. 154(b) by 349 days.

(21) Appl. No.: 11/993,991

(22) PCT Filed: Jul. 5, 2006

(86) PCT No.: PCT/EP2006/006559
§ 371 (c)(1),
(2), (4) Date: Aug. 11, 2008

(87) PCT Pub. No.: WO2007/003428
PCT Pub. Date: Jan. 11, 2007

(65) Prior Publication Data
US 2009/0173050 A1    Jul. 9, 2009

(30) Foreign Application Priority Data
Jul. 5, 2005 (EP) .................................. 05014530
Jul. 5, 2005 (EP) .................................. 05014531

(51) Int. Cl.
B01D 24/00 (2006.01)
B01D 39/06 (2006.01)
B01D 50/00 (2006.01)
F01N 3/00 (2006.01)

(52) U.S. Cl. .............................. 55/523; 55/522; 55/524; 422/168; 422/169; 422/170; 422/171; 422/172; 422/177; 422/178; 422/179; 422/180; 422/181; 422/182; 60/297

(58) Field of Classification Search ........... 55/522–524; 422/177–182, 168–172; 60/297
See application file for complete search history.

(56) References Cited
U.S. PATENT DOCUMENTS
4,481,179 A    11/1984  Wei
(Continued)

FOREIGN PATENT DOCUMENTS
DE    3719606    12/1988
(Continued)

OTHER PUBLICATIONS
Brunauer et al., "Adsorption of gases in multimolecular layers", J. Am. Chem. Soc., 1938, 309, vol. 60.
(Continued)

*Primary Examiner*—Walter D Griffin
*Assistant Examiner*—Amber Orlando
(74) *Attorney, Agent, or Firm*—Fulbright & Jaworski, LLP

(57) ABSTRACT

The invention concerns a process for the production of a porous β-SiC-bearing ceramic molded body that includes an aluminum oxide layer at the surface of the pores and passages of the porous β-SiC-bearing ceramic molded body. The invention further concerns a porous β-SiC-bearing ceramic molded body which has pores of a mean pore size in the range of between 0.1 urn and 50 μm and an aluminum oxide layer at the surface of the open pores and passages.

23 Claims, 10 Drawing Sheets

U.S. PATENT DOCUMENTS

| | | |
|---|---|---|
| 4,514,346 A | 4/1985 | Luhleich et al. |
| 4,564,496 A | 1/1986 | Gupta et al. |
| 4,777,152 A | 10/1988 | Tsukada et al. |
| 5,324,692 A | 6/1994 | Benker et al. |
| 5,389,325 A | 2/1995 | Bookbinder et al. |
| 5,429,782 A | 7/1995 | Masutani et al. |
| 5,451,554 A | 9/1995 | Guile et al. |
| 5,474,587 A | 12/1995 | Dias et al. |
| 5,488,021 A | 1/1996 | DeLiso et al. |
| 5,538,681 A | 7/1996 | Wu |
| 5,543,096 A | 8/1996 | Wu |
| 5,759,460 A | 6/1998 | Niihara et al. |
| 5,853,444 A | 12/1998 | Maier et al. |
| 5,914,187 A | 6/1999 | Naruse et al. |
| 5,914,294 A | 6/1999 | Park et al. |
| 6,017,473 A | 1/2000 | Maier et al. |
| 6,582,796 B1 | 6/2003 | Joulin et al. |
| 7,017,757 B2 | 3/2006 | Wolff et al. |
| 7,316,722 B2 | 1/2008 | Komori et al. |
| 2002/0011439 A1 | 1/2002 | Blum et al. |
| 2002/0011683 A1 | 1/2002 | Gadkaree et al. |
| 2002/0103081 A1 | 8/2002 | Wolff |
| 2002/0142146 A1 | 10/2002 | Gadow et al. |
| 2003/0012938 A1 | 1/2003 | Bauer et al. |
| 2003/0168757 A1 | 9/2003 | Bauer et al. |
| 2003/0178357 A1 | 9/2003 | Wolff et al. |
| 2003/0180538 A1 | 9/2003 | Gray |
| 2005/0084717 A1 | 4/2005 | Tani et al. |
| 2006/0093784 A1 | 5/2006 | Komori et al. |
| 2006/0194018 A1 | 8/2006 | Ohno et al. |

FOREIGN PATENT DOCUMENTS

| | | |
|---|---|---|
| DE | 4025239 | 12/1991 |
| DE | 43 39 667 A1 | 5/1995 |
| DE | 4413127 | 10/1995 |
| DE | 19727115 | 1/1998 |
| DE | 19711831 | 9/1998 |
| DE | 69512339 | 5/2000 |
| DE | 69429323 | 7/2002 |
| DE | 10104882 | 8/2002 |
| DE | 10213016 | 10/2003 |
| EP | 0 570 847 | 11/1993 |
| EP | 0657403 | 6/1995 |
| EP | 0796830 | 9/1997 |
| EP | 1338322 | 8/2003 |
| EP | 1 500 799 A1 | 1/2005 |
| EP | 1514588 | 3/2005 |
| EP | 1541817 | 6/2005 |
| EP | 1544184 | 6/2005 |
| EP | 1666146 | 6/2006 |
| WO | WO-9313303 | 7/1993 |
| WO | WO-0001463 | 1/2000 |
| WO | WO-01/98207 | 12/2001 |
| WO | WO-2005049524 | 6/2005 |

OTHER PUBLICATIONS

Ferro et al., "Wetting behavior in the Al-Si/SiC system: Interface reactions and solubility effects", Acta metall. Mater., 1995, 3061-3073, vol. 43(8).

Fitzner et al., "Fiber-Reinforced Silicon Carbide", Am. Cer. Soc. Bull., 1986, 326, vol. 65.

Greil et al., Biomorphic Cellular Silicon Carbide Ceramics from Wood: I. Processing and Microstructure, J. Eur. Ceram. Soc., 1998, 1961-1973, vol. 18.

Hillig, "Melt infiltration approach to ceramic matrix composites", J Am Ceram Soc, 1988, C-96-C-99, vol. 71.

Morancais et al., "High porosity SiC ceramics prepared via a process involving an SHS stage", J. Eur. Ceram. Soc., 2003, 1949-1956, vol. 23(11).

Qian et al., "Preparation and properties of porous microcellular SiC ceramics by reactive infiltration of Si vapor into carbonized basswood", Materials Chemistry and Physics, Dec. 20, 2003, 648-653, vol. 82(3).

International Preliminary Examination Report re International Application No. PCT/EP2006/06559, issued Jan. 22, 2008.

Greil et al., "Effect of microstructure on the fracture behavior of biomorphous silicon carbide ceramics", Journal of the European Ceramic Society, 2002, 2697-2707, vol. 22(14-15).

(1)

REM image, dark area corresp. pore (2)

Mapping, light area corresp. C (3)

Mapping, light area corresp. Si (4)

Mapping, light area corresp. Al (1)

REM image, dark area corresp. pore (2)

Mapping, light area corresp. C (3)

Mapping, light area corresp. Si (4)

Mapping, light area corresp. Al (5)

Mapping, light area corresp. Ti

POROUS β-SIC-CONTAINING CERAMIC MOLDED ARTICLE COMPRISING AN ALUMINUM OXIDE COATING, AND METHOD FOR THE PRODUCTION THEREOF

CROSS-REFERENCE TO RELATED APPLICATIONS

This application is a national stage filing of PCT/EP2006/006559 filed Jul. 7, 2006 claiming priority to EP 05014530.9 filed Jul. 5, 2005 and EP 05014531.7 filed Jul. 5, 2005.

TECHNICAL FIELD

The invention concerns a porous β-SiC-bearing ceramic molded body with an aluminum oxide layer at the surface and a process for the production thereof.

BACKGROUND OF THE INVENTION

SiC-based materials are employed for a large number of different uses, in particular where high stability at high temperatures or high levels of resistance to corrosion are required. Highly porous and thus also lightweight, SiC-based ceramics are increasingly required as catalyst carriers, combustion aids, Insulating materials, substrate materials or for gas heating in pore burners or for solar installations and for exhaust gas cleaning at high temperatures as filter materials.

SiC-materials on an SiC-base are produced either on the basis of SiC-powders (U.S. Pat. No. 6,582,796) or from a mixture of carbon-bearing or silicon-bearing materials. By way of example a carbon-bearing compound is shaped to provide a molded body, then pyrolyzed and converted into an SiC body by melt infiltration with liquid silicon (US No. 2003/0180538). Alternatively a carbon-bearing powder and a silicon-bearing powder can also be shaped to provide a molded body and then converted to SiC (U.S. Pat. No. 4,481,179).

Upon extrusion however the extrusion nozzles are subjected to a high level of wear. In addition the production of stable molded bodies which have a passage structure, in particular a high passage density and a small wall thickness, is not possible in adequate quality. Structures of that kind however are required in particular in the catalyst art and in filter technology. Silicon carbide has a very poor adhesion capability for catalysts. Consequently it is desirable not only to improve the stability of the molded body but in particular also the adhesion properties thereof, in particular for catalysts and catalyst materials.

The object of the invention is to provide an improved process for the production of porous SiC-based ceramics, in which the molded body can be more easily extruded, wear and abrasion at the molding tools is reduced and/or the energy consumption is low.

A further object is to provide a process for the production of porous SiC-based ceramics which permits the extrusion of very fine passage structures with a high passage density and a small passage wall thickness.

A further object is to provide a porous ceramic SiC-based molded body with a definable pore structure and adequate porosity and fine-cell nature (passage density), which is preferably suitable as a catalyst carrier and/or filter and/or which further preferably has excellent temperature resistance and chemical and mechanical resistance.

A further object is to provide a mechanically stable porous ceramic SiC-based molded body which has very fine passage structures with a high passage density and which can preferably be produced by extrusion.

A further object is to provide a porous ceramic SiC-based molded body whose article has improved adhesion properties, in particular for catalysts or catalyst materials.

BRIEF SUMMARY OF THE INVENTION

The object of the invention is attained by the provision of a process for the production of a porous ceramic molded body of β-SiC, wherein the process includes the following steps:

(a) extruding a molded body from a material which includes silicon-bearing particles, preferably with a grain size from a range of between 0.1 and 190 μm, carbon-bearing particles, preferably with a grain size from a range of between 0.01 and 150 μm, aluminum-bearing particles and a cokable organic binding agent, and (b) pyrolyzing the porous molded body produced in step (a) at a temperature of between 600 and 1000° C., (c) silicating the porous molded body by heating to a temperature in a range of between 1100 and 1500° C., preferably in an oxygen-free atmosphere, obtaining the porous β-SiC-bearing molded body which has an aluminum layer at the surface, and (d) oxidizing the surface of the aluminum layer from step (c) to afford an aluminum oxide layer.

The aluminum layer from step (c) is disposed on the surfaces of the open pore and passage structure of the porous SiC-bearing molded body. In an embodiment in step (d) only the surface of the aluminum layer is oxidized to provide an aluminum oxide layer. In another embodiment in step (d) the aluminum layer is completely oxidized to provide aluminum oxide.

The process according to the invention improves the extrudability of the material used for production of the porous molded body, wherein abrasion at the tools used is reduced and/or very fine-cell and thin-wall structures can be extruded. It has been found that honeycombs with a minimum wall thickness of 150 μm can be extruded.

In addition the process according to the invention provides a molded body, to which a catalyst layer can be directly applied, with the catalyst layer having excellent adhesion capability.

Preferred developments of the process for the production of highly porous ceramic β-SiC molded bodies are recited in claims 2 through 12.

Preferably the silicon-bearing particles and the aluminum-bearing particles are disposed separately from each other as individual substances, in particular as separate particles. It is however also possible to use silicon-aluminum alloy-bearing particles instead of silicon-bearing particles in combination with aluminum particles. Preferably however the silicon-bearing particles and the aluminum-bearing particles are in the form of separate particles and no particles in the form of a silicon-aluminum alloy and/or no silicon particles doped with aluminum are used. Preferably the aluminum-bearing particles used do not include any aluminum oxide and/or preferably do not have an aluminum oxide layer.

The term "silicon" in accordance with the invention includes both silicon and also silicon-aluminum alloys with preferably an aluminum proportion of less than 20 atomic percent, further preferably less than 10 atomic percent, most preferably less than 5 atomic percent, with respect to the amount of silicon and aluminum. Preferably the silicon includes pure silicon without aluminum alloy and/or without aluminum doping.

Preferably the material from which the porous molded body is produced includes silicon-bearing particles with a grain size from a range of between 0.1 and 100 μm and/or carbon-bearing particles with a grain size from a range of between 0.01 and 50 μm.

The term "aluminum-bearing" in accordance with the invention includes both aluminum and aluminum alloys in which metals such as for example silicon, magnesium and zinc are alloyed in the aluminum. Preferably particles of pure aluminum are used as the aluminum-bearing particles.

The aluminum particles used in step (a) are aluminum particles with or without an aluminum oxide layer. In an embodiment the material extruded in step (a) contains less than 5% by weight, preferably less than 1% by weight, most preferably no aluminum oxide, with respect to the aluminum. Preferably aluminum particles without oxide layer are used. The aluminum-bearing particles can be coated with a protective layer which protects the aluminum from oxidation. The protective layer preferably decomposes in the pyrolyis operation carried in step (b). The protective layer can be a polymer or wax. By way of example stearates or polyethylene glycols have proven to be suitable.

Preferably technically pure to analytically pure aluminum and/or silicon are used in step (a).

The aluminum-bearing particles can be of any possible form. Particularly preferably the aluminum-bearing particles are in flake form.

In an embodiment the ratio of diameter to thickness of the aluminum flakes is at least 4, preferably at least 6.

In an embodiment the flake-form, aluminum-bearing particles are of a thickness in a range of between 0.01 and 14 μm and are of a mean particle diameter in a range of between 0.1 and 70 atm. Preferably the flake-form, aluminum-bearing particles are of a thickness in the range of between 0.1 and 5 μm and are of a mean particle diameter in a range of between 25 and 35 μm. Most preferably the flake-form, aluminum-bearing particles are of a thickness in a range of between 0.5 and 2 μm and a mean particle diameter in a range of between 28 and 32 μm.

In an embodiment in step (a) the atomic ratio of aluminum, silicon and carbon is so set that the formation of aluminum carbide and aluminum silicon carbide is avoided. Preferably the pyrolyzed molded body has an atomic ratio of Al, Si and C, which arises out of the triangular region of the points identified by Al, Si and SiC in the ternary phase diagram, as shown in FIG. 1, wherein the aluminum content is In a range of between 5 and 40 atomic percent, preferably in a range of between 18 and 23 atomic percent, with respect to the content of aluminum, silicon and carbon, and the silicon content is in a range of between 50 and 55 atomic percent, with respect to the content of silicon and carbon. Preferably carbon and silicon are present in the same atomic ratio.

In an embodiment the amount of aluminum with respect to the weight of the pyrolyzed molded body is in a range of between 1 and 35% by weight, preferably between 5 and 35% by weight, most preferably between 10 and 35% by weight.

With an aluminum content of more than 35% by weight with respect to the weight of the pyrolyzed molded body the pores of the molded body are closed. With an aluminum content of less than 1% by weight with respect to the weight of the pyrolyzed molded body the formation of an aluminum or aluminum oxide layer is made more difficult.

In an embodiment the molded body is dried after step (a).

Preferably in step (a) titanium, a titanium compound and/or a titanium alloy is also added to the material. By way of example it is possible to use titanium hydride. The aluminum used in step (a) can also include titanium in the form of an alloy. The titanium, the titanium compound and/or the titanium alloy can be added in the form of particles which are referred to hereinafter as titanium-bearing particles. The mean particle diameter of the titanium-bearing particles is preferably in a range of between 1 and 100 μm, further preferably in a range of between 55 urn and 65 μm.

In an embodiment the proportion of titanium in the pyrolyzed body is between 0.1 and 2% by weight, preferably between 0.4 and 1.5% by weight, most preferably between 0.6 and 1% by weight, in each case with respect to the weight of the pyrolyzed body.

In an embodiment the amount of titanium with respect to the weight of aluminum is in a range of between 2 and 20% by weight, preferably between 4 and 10% by weight.

Preferably the silicating operation is implemented at a temperature in a range of between 1100 and 1500° C. Preferably the silicating operation takes place with the exclusion of oxygen, preferably under vacuum or in an argon atmosphere. Preferably the silicating operation does not take place in a nitrogen atmosphere, thereby avoiding the formation of silicon nitride. Silicon nitride has a negative influence on the stability of the porous β-SiC-bearing molded body.

Preferably the carbon-bearing particles used in the process according to the invention have an internal area of at least 350 m$^2$/g In accordance with BET. The method of determining the BET value is carried out in accordance with the method described by Brunauer, Emmet and Teller in the Journal of American Chemical Society, volume 60, 1938, page 309.

Preferably the silicon-bearing particles, the carbon-particles and the aluminum-bearing particles in a proportion of 80% by weight, preferably 90% by weight, particularly preferably 100% by weight, are not in the form of agglomerates and/or not in the form of granulates, in which respect those values relate to the total weight of the silicon-bearing particles, carbon-particles and aluminum-bearing particles.

The extruded molded body preferably does not contain any SiC prior to the silicating operation in step (c).

Preferably steps (a), (b) and/or (c) are carried out with the exclusion of oxygen, further preferably under vacuum and/or in an argon atmosphere.

In an embodiment after step (c) in step (d) the aluminum layer formed on the β-SiC-molded body is oxidized to give aluminum oxide by the addition of oxygen or oxygen-bearing atmosphere. In an embodiment after step (c) in step (d) the aluminum layer formed on the β-SiC-molded body is oxidized to give aluminum oxide by oxygen in the air. The aluminum oxide layer which is produced In step (d) by oxidation of the aluminum layer from step (c) can advantageously act as a binding agent, for example for catalytically active coatings.

In an embodiment a catalyst layer is applied to the aluminum oxide layer. The term aluminum oxide layer is used in accordance with the invention to denote pure aluminum oxide layers, but preferably aluminum layers with an aluminum oxide layer on the side remote from the SiC. The catalysts used are for example noble metals such as Pt, Pd, Rh, Ru and Re as well as their oxides and/or combinations thereof. Transition metal oxides such as $V_2O_5$, $CeO_2$, $La_2O_3$, $MnO_2$ and CuO are also possible. Mixed oxides with yttrium and manganese have also proven worthwhile.

As the temperatures for the process according to the invention are below 1900° C. the porous molded body is predominantly in the P-phase.

During the production process molten materials comprising an aluminum-silicon alloy are produced, in which respect the proportion of silicon varies greatly.

During the increase in temperature in the pyrolysis operation the aluminum melts and with the silicon at the contact locations forms an alloy with a high proportion of aluminum, the melting point of the eutectic of the Al—Si-system being 577° C. At below 1000° C., that is to say during the pyrolysis operation, no silicating of the carbon structure yet takes place. With an increasing rise in temperature to 1500° C. more and more silicon passes together with the aluminum into an alloy melt which then leads to silicating of the carbon. It is observed that, depending on the respective amount of added aluminum in the starting mixture, the silicating procedure already begins at 1100° C. and temperatures up to 1450° C. are even sufficient for approximately complete conversion of the silicon to SiC.

After the silicating operation aluminum is left behind possibly together with the titanium on the surface of the SiC-structure. The aluminum with the unreacted silicon forms an alloy with a very high proportion of aluminum.

Below 1000° C. aluminum has non-wetting properties on SiC (Ferro and Derby, Acta metall. mater vol. 43, pages 3061 through 3073). It is only above 1000° C. that the contact angle falls from 140° to 40°-500 and wetting of the SiC-surface occurs. After the conclusion of the silicating process in the cooling phase below 1000° C. wetting of the SiC-surface by the aluminum again falls greatly and local enrichment phenomena in respect of the aluminum occur. For a later coating, for example with a catalyst, uniform distribution of the aluminum on the SiC-structure is however desired.

In a preferred embodiment therefore in step (a) titanium or a titanium compound is additionally added. By way of example titanium hydride is used. Titanium hydride decomposes above 400° C. to give titanium and hydrogen. The hydrogen is burnt with the other pyrolysis gases in the pyrolysis process and the titanium, above the melting point of aluminum, forms an alloy with the aluminum. The titanium content in the material in step (a) however is preferably so slight that there is no measurable influence on the change in melting point. In an embodiment titanium aluminide, titanium silicide and/or titanium aluminum silicide are also additionally formed.

Due to the alloying addition of titanium and/or titanium compounds to aluminum the wetting angle on SiC is already reduced at temperatures below 1050° C., to preferably between 40 and 70°, so that admixing titanium or titanium compounds to the aluminum makes it possible to achieve very much finer and more uniform distribution of the aluminum on the SiC-surface, The more uniform distribution of the aluminum on the SiC is also retained below 1000° C., even down to complete cooling. That makes it possible to obtain substantially finer and/or thinner aluminum coatings.

In an embodiment aluminum coatings are obtained involving a thickness In a range of between 50 and 500 nm, preferably between 50 and 300 nm.

Furthermore the addition of titanium, titanium compounds and/or titanium alloys also makes it possible to avoid the formation of unwanted aluminum carbide, for example $Al_4C_3$, which decomposes due to moisture in the air and detrimentally influences the stability of the SiC-structure and its adhesion properties, for example for a catalyst.

In an embodiment a ceramic molded body is obtained, wherein the surface of the open pores and passages of the porous β-SiC-bearing molded body are covered to between 55% and 70% with an aluminum oxide layer.

Furthermore the process according to the invention represents a process which is inexpensive in comparison with the state of the art for the production of SiC-based ceramics as the temperatures are below 1500° C. and the energy costs are thus low.

Preferably the β-SiC contained in the porous β-SiC-bearing molded body according to the invention comprises β-SiC (cubic crystal form of the SiC) to a proportion of 90% by weight, preferably 95% by weight, further preferably 98% by weight, particularly preferably 100%. Those values relate to SiC without alloying elements. β-SiC is formed at temperatures of between 1450° C. and 1900° C. from silicon and carbon.

The term "silicon-bearing" in accordance with the invention is used to denote substances which contain elementary silicon or silicon alloys, but preferably no silicon carbide and/or $SiO_2$. Any Si-modification, for example α, β, δ or γ-silicon can be used as the elementary silicon. Zinc, magnesium and/or titanium can be used as the alloying metals.

The term "carbon-bearing" in accordance with the invention is preferably used to denote substances which contain or include elementary carbon, most preferably carbon in the graphite modification.

Preferably carbons are used, whose microcrystalline regions build up a porous structure, as is the case for example with activated coke and activated carbon. The term activated coke in accordance with the invention is used to denote a carbon-bearing substance which, after carbonization from the raw material, already has an internal area. The carbonization operation which is also referred to as coking In respect of given starting substances such as for example the macroporous polymer adsorber Ambersorb 600® from RohmHaas already leads without further activation to internal areas of between 500 and 600 $m^2/g$.

The term silicon melt in accordance with the invention is used to denote a melt of a silicon-aluminum alloy. The silicon-aluminum alloy can also contain further alloying elements, in particular titanium, magnesium and/or zinc.

Preferably the carbon-bearing particles (which hereinafter are also referred to as powder carbons) are selected from the group consisting of activated carbon, coke, coal, carbon black, graphite, pyrolyzed resin and mixtures thereof. Activated carbon, graphite and/or mixtures thereof are particularly preferably used. By virtue of their microcrystalline structure both substances have the property of reacting particularly well with silicon, silicon-bearing substances and/or silicon alloys to give SiC. Preferably the reaction of silicon and/or the silicon-bearing material is effected with activated carbon, graphite and/or mixtures thereof which are bound by way of a cokable organic binding agent.

The powder carbons from the group consisting of activated carbon, coke, coal, carbon black, graphite, pyrolyzed resin and mixtures thereof can be produced for example from starting materials such as wood, fruit stones or pips, fruit skins, pitch or tar. Generally biomorphous carbons, that is to say carbons which are obtained by pyrolysis of biomorphous material such as wood, fruit pips or stones and fruit skins are preferred as powder carbons. Biomorphous carbons can be particularly well reacted with silicon to give SiC as they have microcrystalline regions for a large part.

Carbon is arranged In graphite in the hexagonal structure in mutually superposed levels. In purely crystalline graphite those levels are arranged in mutually parallel relationship and there are no disordered regions. In partly crystalline carbons such as for example activated carbon there are large regions in which the graphite levels are present in disordered relationship with each other. These are the amorphous regions. In those amorphous regions, there are small regions in which between three and four graphite levels are present in mutually parallel relationship. Those regions are referred to as microcrystalline regions. The term "microcrystalline regions" is therefore used to denote smaller regions in which between three and four graphite levels are disposed in mutually parallel relationship.

The term "silicating" in accordance with the invention is used to denote the reaction of silicon-bearing and carbon-bearing compounds to give SiC. An aluminum layer is formed on the surface of the SiC body, which is oxidized in a subsequent step. In an embodiment the aluminum layer contains between 2 and 20% by weight, preferably between 4 and 10% by weight of titanium, with respect to the amount of aluminum.

The term "cokable" in accordance with the invention is used to denote substances In respect of which, upon heating above 500° C. in an inert atmosphere, there is left behind a residue which at least 85% by weight and preferably at least 95% by weight comprises carbon, with respect to the total weight of the residue.

The term "binding agent" is used in accordance with the invention to denote substances which upon mixing with the silicon-bearing particles, the carbon-bearing particles and the aluminum-bearing particles form a material from which a molded body can be shaped.

Preferably organic resins or modified starches are used as a cokable organic binding agent. Both the organic resins and also the modified starches are carbonizable or cokable. In that respect resins with aromatic nuclei are particularly preferred. Besides the use of phenolic resin in powder form such as Novolak modified starches which can be used both in powder form and also in fluid form have proven to be suitable. Novolaks have a carbon yield of about 55% up to 1000° C. and act on the one hand as a binder for the carbon particles while on the other hand they also react with free silicon to give SiC as they are converted by the pyrolysis operation into a so-called glass carbon. Modified starches, with 20%, have a markedly lower carbon yield in pyrolysis up to 1000° C., but carbon bridges are however also formed between the carbon particles similarly to glass carbon from the phenolic resin. Modified starches are chemically altered in such a way that they have a higher level of resistance to heat, resistance to acid and shearing stability, but they are broken down to the same substances as native starch in the human body. Modified starches are for example oxidized starch (E 1404), monostarch phosphate (E 1410), distarch phosphate (E 1412), phosphated distarch phosphate (E 1413), acetylated distarch phosphate (E 1414) and acetylated starch (E 1420).

The use of a carbonizable binding agent is advantageous for stability after binding removal and for the stability in the porous molded body. The term "binding removal" is used to denote the pyrolytic decomposition of the binding agents and other additives, which can also be referred to as a coking process or a carbonization process. Without the carbonizable binding agent the silicon and carbon particles and the aluminum-bearing particles are present in the molded body only in a very weakly bound structure. By virtue of the use of carbonizable binding agent, the carbon-bearing particles, the silicon-bearing particles and the aluminum-bearing particles, after the binding removal operation, are bound by way of the carbonized binding agent in a stable molded body. Binding of the carbon particles by way of the carbonized binding agent further leads to an improvement in the stability of the SiC-structure produced by the silicating procedure. Binding between the SiC crystals in the porous structure is already promoted by the silicon-bearing and carbon-bearing structure.

The porosity of the β-SiC-bearing ceramic molded body can be extremely advantageously adjusted by way of the particle size of the carbon-bearing, silicon-bearing particles and the aluminum-bearing particles, which are used for production of the β-SiC-molded body.

When using coarse starting powder, a very coarse-pore structure is already obtained in the pyrolyzed intermediate stage, which then gives rise to a corresponding coarse-pore SiC-structure by virtue of fusing of the silicon or the silicon alloy and the formation of SiC. Preferably the silicating operation is carried out under vacuum or in an inert (oxygen-free) atmosphere, for example an argon atmosphere. The melt which is sucked away leaves behind pores which were previously filled with silicon-bearing particles or aluminum-bearing particles. That pore structure still remains after formation of the β-SiC. Accordingly, smaller pores are also obtained when using a smaller grain distribution In respect of the silicon or the aluminum. The grain size distribution is selected in accordance with the desired pore distribution in the porous molded body.

As the structure or matrix which is predetermined by the silicon-bearing and carbon-bearing and aluminum-bearing molded body is silicated, that is to say reacted with silicon or silicon-bearing substances, the predetermined matrix or structure is "transferred" onto the β-SiC-bearing molded body. Accordingly It is possible in a surprisingly simple fashion to produce a β-SiC-bearing molded body of predetermined or defined porosity, the surface of the passages and pores being provided with an aluminum and/or aluminum oxide layer.

In an embodiment the proportion of aluminum in the porous β-SiC-bearing molded body is between 1 and 35% by weight, preferably between 5 and 35% by weight, most preferably between 10 and 35% by weight, with respect to the mass of the porous β-SiC-bearing molded body.

The passage walls and/or pores are at least partially and preferably substantially completely and still more preferably completely provided with an aluminum and/or aluminum oxide layer. In that respect it has been found that a distribution of the aluminum on the porous SiC-structure, which is as uniform as possible, is achieved at the end of step (c) in particular when titanium or a titanium compound or a titanium alloy is additionally added to the starting mixture. In step (d) that then gives a homogenous aluminum oxide layer which in turn can act as an adhesive base for further coatings.

In an embodiment of the process according to the invention, a porous β-SiC-bearing molded body is obtained, in which between 55% and 70% of the area of the open pores and passages are covered with the aluminum oxide layer, preferably continuously. Preferably between 65% and 70% of the area of the open pores and passages is covered with the aluminum oxide layer.

In an embodiment the silicon-bearing, carbon-bearing and aluminum-bearing molded body is extruded into a structure which contains passages and which consists of a large number of passages. Preferably the passage-bearing structure has passages which extend along the longitudinal axis of the molded body and which are arranged in substantially mutually parallel relationship. The cross-section of the passages is generally also referred to a cell. Preferably the passages are of a square or polygonal cross-section, for example a hexagonal or octagonal cross-section. A hexagonal cross-section is particularly preferred as it produces a lower level of frictional resistance when gaseous and/or liquid substances flow therethrough. Preferably the passage-bearing structure involves a passage density of between 50 and 400 passages/inch$^2$, further preferably between 150 and 350 passages/inch$^2$, further preferably between 200 and 300 passages/inch². The term "passage density" according to the invention is used to denote the number of passages per inch² perpendicularly to the longitudinal axis of the passages in the porous molded body.

In that respect the passage wall thicknesses should be as thin as possible in the porous β-SiC-molded body. The quality of such molded bodies with thin-wall passages is improved by the extrusion process according to the invention.

In a preferred embodiment the passage walls of the extruded β-SiC-molded body are of a wall thickness in the range of between 50 µm and 480 µm, preferably between 50 and 280 µm, preferably between 150 and 280 µm, still more preferably between 200 and 250 µm.

That provides for adequate stability with a markedly enlarged area, which makes it possible to produce smaller catalyst carriers. It is precisely in the exhaust gas field of diesel automobiles that it is necessary to provide catalyst carriers of smaller volume. The production of thinner wall thicknesses is first made possible by the production process according to the invention as there is no SiC but in addition aluminum present in the starting material. The combination of a catalyst carrier with many passages/inch² and small wall thicknesses provides a markedly increased area which makes it possible to provide smaller catalyst carriers with the area remaining the same.

In an embodiment of the process according to the invention the passages of the molded body are closed alternately in the process according to the invention after step (a), (b) and/or (c).

In an embodiment the silicon-bearing particles are of a grain size from a range of between 0.1 and 190 µm and/or the carbon-bearing particles are of a grain size from a range of between 0.01 and 150 µm. In a preferred embodiment the silicon-bearing particles are of a grain size from a range of between 0.1 and 75 µm and preferably have a $d_{50}$ value of between 40 and 50 µm and/or the carbon-bearing particles are of a grain size from a range of between 0.01 and 35 µm and preferably have a $d_{50}$ value of between 8 and 15 µm.

By way of example, for a molded body with pores in an average pore size in the range of between 10 and 15 µm carbon-bearing particles with a grain size in the range of between 8 and 15 µm are used and silicon-bearing particles with a particle size in the range of between 0.1 and 75 µm and with a $d_{50}$ value of 45 µm are used.

The $d_{50}$ value gives the particle size which represents the upper limit for 50% of all particles, that is to say $d_{50}$ value=45 µm means that 50% of all particles in the powder in the respective substance are smaller than 45 µm.

Preferably aqueous solvent mixtures are used as the liquid phase. Water is particularly preferably used.

In addition extrusion additives such as plasticizers, waxes and/or tensides and so forth are preferably added to the mixture to be extruded. Those extrusion aids provide for better slidability of the particles relative to each other and lead to homogenous distribution of all constituents during extrusion.

Preferably also green body binding agents, for example cellulose ether or cellulose ether derivatives, are added to the mixture to be extruded. By way of example methylhydroxypropylcellulose can be used as the green body binding agent. The green body binding agent stabilizes the molded body obtained after extrusion. Furthermore the green binding agent also promotes homogenization of the various constituents of the mixture during extrusion.

In a preferred embodiment fibers are also incorporated into the mixture to be extruded. The fibers can be for example carbon fibers and/or short fibers of SiC, in particular whiskers, and/or polymer fibers to which different functions are attributed.

The term "whisker" in accordance with the invention is used to denote monocrystalline short fibers. Short fibers of SiC can be used for reinforcing the SiC-structure. Preferably the short SiC-fibers comprise β-SiC.

The carbon fibers can provide an improvement in mechanical stability. A carbon fiber-reinforced SiC-body can be obtained by the introduction of carbon fibers based on PAN (polyacrylonitrile) or pitch. The carbon fibers are not adversely affected by the pyrolysis procedure and the fibers are partially silicated from the exterior by the silicating procedure, that is to say externally disposed carbon is partially reacted to give SiC, but the carbon fibers are retained in the core. The silicon or the silicon alloy primarily reacts with the particles of the carbon to give SiC and encases the carbon fibers. That encasing provides that the carbon fibers are protected from oxidizing conditions which may possibly occur. The carbon fibers introduced lead to a marked improvement in thermoshock stability.

When using polymer fibers, directed, preferably linear pore structures can be produced after carrying out a pyrolysis operation, in the molded body. The polymer fibers are for example organic fibers which burn In the pyrolysis operation. By way of example PE fibers (polyethylene fibers) can be used as the polymer fibers. In addition natural fibers such as jute, flax, cellulose or lignin fibers can also be used as possible polymer fibers. The polymer fibers burn completely or partially in the pyrolysis operation and leave hollow spaces behind. In the pyrolysis operation the natural fibers are converted to carbon fibers whereby their volume decreases or also burns. That makes it possible to produce directed pore structures. Both the pore diameter and also the pore length or depth can be definedly adjusted by way of the fiber diameter and the fiber length of the carbon fibers. When using fiber mixtures of different fiber lengths and/or involving different fiber diameters it is possible to adjust a defined pore structure or pore distribution in the molded body. That makes it possible to produce an SiC-bearing molded body of defined pore size, pore distribution and pore depth. Preferably polymer fibers of a fiber length In the range of between 0.5 and 5 mm are used. Alternatively to or cumulatively with the polymer fibers, it is also possible to use a polymer powder, In which case directed pore structures are not produced by the polymer powder.

After extrusion the molded body obtained is preferably pyrolyzed. Pyrolysis is preferably effected in an inert, preferably non-oxidizing, atmosphere. By way of example pyrolysis can be carried out In an inert gas atmosphere such as nitrogen or argon or in a vacuum. Pyrolysis can be carried out at a temperature of between 600° C. and 1000° C. In the pyrolysis operation the extrusion aids are removed and the binding agents such as for example phenolic resins are carbonized and converted into glass carbon with a reduction in volume and weight. That results in the formation of pores in the molded body.

The term "glass carbon" is used to denote a form of carbon with pronounced structural lattice disorder and glass-like fracture pattern. The carbon atoms with $sp^2$-binding are arranged in plane layers involving hexagonal symmetry. In contrast to graphite those layers in glass-like carbon are not arranged regularly over relatively large regions. Bands of graphically ordered, mutually layered structures form a polymer-like ball structure. Glass carbon is pore-free in the macroregion, but there are numerous hollow spaces between the graphite layers. That leads to extremely high resistance to corrosion in relation to acid and alkaline reagents. Glass carbon is only attacked by oxygen above 600° C. and oxidizing melts. Glass carbon can be well reacted in the resin-silicon-aluminum powder mixture, external infiltration of glass carbon with SiC-melt is not readily possible.

Due to the co-extrusion of silicon-bearing, carbon-bearing particles and aluminum-bearing particles, a porous structure is produced in the pyrolysis operation, which contains carbon, silicon and aluminum in homogenously mixed condition, wherein the carbon from the carbonized binding agent holds together both the carbon-bearing particles, the aluminum-bearing particles and also the silicon-bearing particles, as a binder.

The extruded molded body can be of a parallelepipeds or cylindrical configuration. The configuration can also involve a polygonal cross-section, by way of example a hexagonal or octagonal cross-section. Preferably the extruded molded bodies have passages which extend along the longitudinal axis of the molded body and which are arranged in substantially mutually parallel relationship.

For the production of the molded bodies in step (a), it is possible for example to use the production processes which are disclosed in DE 101 04 882 A1 and DE 102 13 016 A1 and which are hereby incorporated by reference, wherein the shaped body is obtained by suitable modification to the processes.

The production process according to the invention is preferably effected in three heat treatment stages:

1. Drying of the extruded molded body which contains silicon- and carbon-bearing and aluminum-bearing particles, forming a green body;
2. Pyrolysis in an oxygen-free, preferably inert atmosphere, for example in nitrogen or argon, with continuous flushing to remove the pyrolysis products;
3. Silication to convert the carbon and the silicon into β-SiC, preferably in an oxygen-free atmosphere, for example under vacuum or in an argon atmosphere, wherein the aluminum or an aluminum-silicon alloy with a small proportion of Si remains behind at the surface of the SiC.

Preferably silication is effected in an atmosphere which is not nitrogen-bearing. That avoids the formation of silicon nitride. Silicon nitride has a detrimental effect on the stability of the porous β-SiC-molded body.

Drying and pyrolysis are effected for example using microwave technology. Both the carbon particles and the silicon particles as well as the aluminum particles couple to the microwave radiation, by virtue of their conductivity. In particular the carbon particles are greatly heated up by the microwave radiation. In that way the green bodies can be more rapidly heated to the pyrolysis temperature by means of microwaves. Preferably a process is used, in which the green body is heated simultaneously with conventional heating technology from the exterior (for example by resistance heating elements such as Kantal heaters) and with microwave technology from the interior. In order to avoid the non-homogenous microwave field having an influence on the pyrolysis procedure the temperature treatment is preferably carried out in a continuous furnace.

In the drying step the water is removed from the wet extruded green body. The dry molded body obtained in that way has a very dense structure as, besides the extrusion additives, it also still contains the binding agent.

All additives such as cellulose ether and the soap are burnt out of the structure by the pyrolysis operation. In addition the binding agent used is carbonized, that is to say converted into a pure carbon structure, with decomposition products being separated off. It markedly loses volume as a result. That controlled burning-off effect in respect of the additives and a part of the binding agent leads to a porous structure. The procedure results in a porous carbon lattice in which the silicon-bearing particles and aluminum-bearing particles are fixedly bound. The aluminum is partly disposed on the surface of the silicon particles. An aluminum-silicon alloy is present in small amounts in the boundary region.

The preferably implemented pyrolysis of the extruded molded body is preferably effected at a temperature of between 600 and 1000° C., further preferably at a temperature of between 700 and 900° C. and particularly preferably at a temperature of between 750 and 850° C. in an inert, oxygen-free atmosphere. Pyrolysis preferably takes place in a nitrogen atmosphere. In order to prevent destruction or cracking of the molded bodies due to the gases which are produced in the pyrolytic decomposition of the organic binding agents and/or extrusion additives, a slow heating rate is selected, for example between 1 and 2° C./min, preferably up to a temperature of between about 400 and 500° C. A higher heating rate, for example 5° C./min, can be subsequently used. The pyrolysis temperature is preferably maintained for between 0.25 and 4 h, particularly preferably for between 0.5 and 1 hour.

The subsequent silicating step is preferably effected at temperatures above the melting point of the alloy of the silicon-aluminum powder mixture used, preferably at a temperature of between 1100° C. and 1500° C., most preferably at between 1150 and 1500° C. The final temperature is preferably held for between 1 and 4 hours. The molten silicon or the silicon-aluminum alloy is in that case sucked into the porous carbon structure and leaves behind hollow spaces which form the later pores. Transformation into the β-SiC occurs at the holding point above the melting point. That does not involve a classical sintering operation but chemical transformation into a new compound. Preferably the silicating operation Is carried out with the exclusion of oxygen. In a particularly preferred aspect the pyrolysis operation is carried out under vacuum or in an argon atmosphere. The aluminum remains behind on the surface of the SiC-structure. The aluminum can also still contain residues of silicon.

Pyrolysis and/or silicating are preferably carried out in an inert, oxygen-free atmosphere.

Pyrolysis of the molded body and silicating of the molded body can be carried out in two separate process steps. The two-stage implementation of the pyrolysis and silicating procedures can also be combined together in a one-stage process. The gaseous products (pyrolysates) which are produced upon pyrolytic decomposition of the binding agent and any extrusion additives which may be present does not represent substantial impairment of the silicating procedure. In accordance with a preferred development of the invention the silicating and pyrolysis operations as well as the reactive conversion to SiC-, SiC/C-, Si/SiC- and/or Si/SiC/C-ceramics are carried out together in one process step in an inert atmosphere. Preferably pyrolysis takes place in a nitrogen atmosphere with continuous flushing in order to remove the pyrolysis products. Silicating is preferably effected in an inert, oxygen-free atmosphere, particularly preferably under vacuum or in an argon atmosphere.

In accordance with the invention there is provided a porous β-SiC-bearing ceramic molded body which has a mean pore diameter which is also referred to as the mean pore size in the range of between 0.1 μm and 50 μm and has an aluminum oxide layer at the surface of the open pores and passages in the β-SiC-bearing ceramic molded body.

In an embodiment between 55% and 70% of the surface of the open pores and passages of the porous β-SiC-bearing molded body is lined with the aluminum oxide layer, preferably continuously. Preferably between 65% and 70% of the surface of the open pores and passages of the porous β-SiC-bearing molded body is lined with the aluminum oxide layer.

In an embodiment the proportion of aluminum in the porous β-SiC-bearing molded body is between 1 and 35% by weight, preferably between 5 and 35% by weight, most preferably between 10 and 35% by weight, with respect to the mass of the porous β-SiC-bearing molded body.

In an embodiment the aluminum oxide layer also includes titanium, titanium alloys and/or titanium compounds, preferably in the oxidized form.

In an embodiment of the β-SiC-bearing ceramic molded body the surface of the open pores and passages is lined continuously with the aluminum oxide layer, at a proportion of 40%, preferably 55%, further preferably 70%, with respect to the surface area of the open pores and passages.

In an embodiment the layer thickness of the aluminum oxide layer is below 500 nm. Preferably the layer thickness of the aluminum oxide layer is in a range of between 50 nm and 500 nm, further preferably in a range of between 100 and 300 nm.

Preferably the β-SiC-bearing ceramic molded body involves a pore size of between 3 and 35 μm, further preferably between 4 and 20 μm, particularly preferably between 5 and 15 μm. The term mean pore size is used to denote the average pore size which results from the mean value of all pore sizes. The pore diameter can also be referred to as the pore size.

Preferably the porous β-SiC-bearing molded body has a three-dimensional, continuous β-SiC-structure.

The addition of titanium and/or a titanium alloy substantially avoids the formation of aluminum carbide and/or aluminum silicon carbide, in particular $Al_4C_3$. Preferably the β-SiC-bearing ceramic molded body contains less than 0.01% by weight of aluminum carbide and/or aluminum silicon carbide, with respect to the content of aluminum. Most preferably the β-SiC-bearing molded body does not contain any aluminum carbide and/or aluminum silicon carbide.

In an embodiment the β-SiC-bearing ceramic molded body includes an aluminum-titanium alloy and/or oxides thereof as a coating. Preferably the content of titanium is between 2% by weight and 20% by weight, further preferably between 4% by weight and 10% by weight, with respect to the amount of the aluminum. The same applies to the oxides, with the calculation being adapted in accordance with the molecular weights.

Preferred developments of the porous β-SiC-bearing ceramic molded body are recited in appendant claims 14 through 21.

In this case the porosity of the β-SiC-bearing molded body is in a range of between 5% and 90%, preferably between 20% and 80%, particularly preferably between 30% and 65%. For porous particle filter media, porosities are preferably set in a range of between 20% and 70%, particularly preferably between 30% and 65%. The term porosity is used to denote the sum of the open hollow spaces in a solid porous body with respect to the external volume thereof. In that respect the sum of the open hollow spaces is specified in % with respect to the external volume which corresponds to 100%.

Preferably the porous β-SiC-bearing molded body has a differential pore distribution with a peak, preferably a unimodal peak. Differential pore distribution is afforded by the specific volume of the pores ($mm^3/g$) in dependence on the pore size of the pores (μm) and is measured for example by means of mercury intrusion. Mercury intrusion is carried out In accordance with DIN 66133. As a result of the mercury intrusion measurement procedure, the result obtained is a pore volume with respect to the total weight of the sample body investigated, for the respective pore size. Differential pore distribution thus represents the specific pore volume at the respective pore size. The specific pore volume specifies the pore volume at the specified pore size with respect to the total weight of the sample body being investigated. The position of the maximum of the peak of the differential pore distribution specifies the most frequently occurring pore size.

Preferably the porous β-SiC-bearing molded body has a differential pore distribution with a unimodal peak with a maximum in the range of between 1 and 25 μm. Preferably the width of that peak at half its height is at a maximum 1.5 times the most frequent pore size. Further preferably the width of the peak at half its height is as great as the most frequent pore size and is particularly preferably at a maximum 80% of the most frequent pore size (see FIG. 5).

By way of example the width of a peak which has a maximum at a pore size of 4 μm, at half its height, is at a maximum 6 μm (1.5 times the most frequent pore size), wherein the width of the peak corresponds to the difference between the larger and the smaller pore diameters at half the height of the peak.

Preferably the β-SiC contained in the porous β-SiC-bearing molded body according to the invention comprises a proportion of 90% by weight, preferably 95%, further preferably 98% by weight, particularly preferably 100% by weight, β-SiC (cubic crystal form of SiC). Those values relate to Si without alloying elements.

The porous β-SiC-bearing molded body has a three-dimensional, continuous β-SiC-structure which preferably includes β-SiC-crystals of a grain size of between 0.1 μm and 100 μm, particularly preferably between 0.1 μm and 10 μm. In an embodiment the three-dimensional continuous SiC structure has substantially no grain boundaries, preferably no grain boundaries.

Preferably the porous β-SiC-structure of the porous β-SiC-molded body according to the invention has a residual content of unreacted silicon or silicon-aluminum alloy, which preferably constitutes at a maximum 20% by weight, further preferably at a maximum 10% by weight, particularly preferably at a maximum 5% by weight, in each case with respect to the total weight of the porous molded body.

Preferably the porous β-SiC-structure of the porous β-SiC-molded body according to the invention has a residual content of free, unreacted carbon, which preferably constitutes at a maximum 5% by weight with respect to the total weight of the porous molded body. In a preferred embodiment the free unreacted carbon includes carbon fibers.

The porous β-SiC-bearing ceramic molded body according to the invention has a porous matrix which includes SiC, SiC/C, Si/SiC and/or Si/SiC/C or consists thereof. Preferably the porous matrix is highly porous. The matrix of the molded body according to the invention is suitable as a catalyst carrier and/or diesel soot particle filter.

The process according to the invention makes it possible to produce in particular particle filters, particularly preferably diesel soot particle filters.

In an embodiment the β-SiC-bearing ceramic molded body is a particle filter, in particular a diesel soot particle filter.

Preferably the β-SiC-bearing ceramic molded body has a passage-bearing structure. Preferably the passage-bearing structure involves a passage density of between 50 and 400 passages/$inch^2$, further preferably between 180 and 350 passages/$inch^2$, particularly preferably between 200 and 300 passages/$inch^2$. Preferably the passage walls are of thickness in a range of between 50 \μm and 480 μm, preferably between 50 and 280 μm, preferably between 150 and 280 μm, still further preferably between 200 and 250 μm.

In an embodiment the passages extend in substantially mutually parallel relationship. In an embodiment the passages extend in substantially mutually parallel relationship along the longitudinal axis of the ceramic molded body.

In a preferred embodiment the skeleton structure of the molded body does not contain $SiO_2$.

In an embodiment the β-SiC-bearing molded body includes between 0 and 5% by weight, preferably between 0 and 3% by weight of carbon, most preferably no carbon, with respect to the total weight of the β-SiC-bearing molded body. Preferably the β-SiC-bearing molded body includes between 0 and 10% by weight, preferably between 0 and 5% by weight of silicon, most preferably no silicon, with respect to the total weight of the β-SiC-bearing molded body.

In accordance with a preferred development the β-SiC-bearing molded body includes:

between 0 and 5% by weight, preferably between 0 and 3% by weight of carbon, between 60 and 95% by weight, preferably between 60 and 70% by weight of β-SiC, between 0 and 10% by weight, preferably between 0 and 5% by weight of Si, and between 1 and 30% by weight, preferably between 5 and 20% by weight of Al, wherein the figures in % by weight respectively relate to the total weight of the β-SiC-bearing molded body and having regard to any further components add up to 100% by weight.

The porous β-SiC-molded body preferably includes a three-dimensional continuous β-SiC-structure. The β-SiC-structure, preferably the three-dimensional β-SiC-structure, is preferably encased with an aluminum oxide layer at the surface of the open pores and passages. In a further embodiment the surface of the open pores and passages of the β-SiC-structure is covered with an aluminum layer which has an aluminum oxide layer on the side remote from the β-SiC-structure.

The term "three-dimensional continuous β-SiC-structure" in accordance with the invention is used to denote a β-SiC-structure which includes reaction-bound β-SiC which without further binding agent forms a strong solid structure. In a further embodiment the three-dimensional continuous β-SiC-structure has substantially no grain boundaries, preferably no grain boundaries. In an embodiment the three-dimensional continuous β-SiC-structure is not made up of SiC-particles.

In conventional SiC-structure configurations the SiC structure is bound by way of a binding agent, preferably molten silicon or an oxide ceramic. The great advantage of a continuous SiC-structure is that the molded body is substantially more stable and resistant to aggressive media such as for example automobile exhaust gases. In the case of conventional SiC-structure configurations in which the SiC structure is bound by way of binding agents, decomposition of the binding agent takes place over time, for example due to oxidation, whereby the molded body is destroyed. The inventors thus surprisingly succeeded in providing one which has outstanding chemical and mechanical resistance. The porous β-SiC-molded body also has excellent adhesion capability for catalysts.

In accordance with a further embodiment the β-SiC-bearing molded body is fiber-reinforced. The fibers, preferably carbon fibers (for example carbonized PAN (polyacrylonitrile) or pitch fibers) and/or short fibers of β-SiC (whiskers) are already introduced into the material to be extruded, in the production of the carbon-bearing molded body, and cause an increase in the strength of the molded body. The short β-SiC-fibers cause a purely mechanical increase in strength. The content of the short β-SiC-fibers is so selected that the newly forming β-SiC-structure is not adversely affected thereby. In contrast the carbon fibers cause a marked improvement in thermoshock stability. The silicon or silicon alloy is primarily reacted with the particles of the carbon particles to give β-SiC and encases the carbon fibers whereby they are only silicated at the surface from the exterior. The carbon fibers are protected by that encasing from any oxidizing conditions which may possibly occur.

In an embodiment the β-SiC-bearing molded body has directed pore structures. Directed pore structures can be produced in the molded body by the use of natural and/or polymer fibers. The fibers are pyrolyzed in the pyrolysis operation which is preferably performed. As a result preferably linear or directed pores of defined pore diameter are produced in the carbon-bearing molded body, which pores after the silicating operation are contained in the β-SiC-bearing ceramic molded body. The diameter of the directed pores can be adjusted by way of the diameter of the fibers used. Preferably the length of the natural and/or polymer fibers is in a range of between 100 and 500 μm. The pores produced by the pyrolysis operation are preferably of a length of between 50 and 500 μm. Preferably the diameter of the directed or linear pores is in a range of between 5 and 50 μm, further preferably between 8 and 25 μm. Adjustment of a defined pore diameter also extremely advantageously makes it possible to produce filters having defined filter properties. The defined pore size of the directed pores can be so adjusted that for example separation of a particle mixture into various particles of different sizes is possible.

In accordance with a preferred embodiment the β-SiC-bearing molded body is a catalyst carrier and/or a diesel soot particle filter. Preferably the catalyst carrier comprises a plurality of parts which are or can be connected by an adhesive. Particularly preferably the adhesive is a ceramic refractory adhesive which has a thermal conductivity of more than 10 W/mK by virtue of admixing thermally highly conductive material. The term "refractory adhesive" in accordance with the invention is used to denote a ceramic-based material which hardens chemically or hydraulically and which is temperature-resistant to at least 100° C., preferably 1600° C.

The β-SiC-bearing molded body is preferably of a parallelepipedic or cylindrical configuration. The molded bodies can also be of a polygonal cross-section, for example a hexagonal or octagonal cross-section. Preferably the β-SiC-bearing molded bodies have passages which extend along the longitudinal axis of the molded body and which are arranged in substantially mutually parallel relationship.

In accordance with a preferred variant the passages are not continuous. In this variant the passages are preferably alternately closed. In other words, the passages which are disposed in substantially mutually parallel relationship are closed alternately at their one end or the other. That makes it possible to use such a β-SiC-bearing ceramic molded body as a filter, wherein the medium to be filled passes through the wall from one passage into the adjacent passage and the particulate impurities are retained. The surface of the passages and pores in the β-SiC-bearing molded body according to the invention is provided with an aluminum oxide layer. That advantageously permits the combined use as a filter and a catalyst carrier.

The object of the invention is further attained by a catalyst system which includes a porous β-SiC-bearing ceramic molded body as set forth in one of claims 13 through 21.

The molded body according to the invention is suitable for example for use in a filter system, in particular a diesel soot particle filter.

The porous β-SiC-bearing ceramic molded body according to the present invention can also be used as a catalyst carrier structure and corresponding catalyst systems.

The catalyst system can be for example an exhaust system of a motor vehicle or an exhaust gas treatment installation of an internal combustion engine, in which the porous β-SiC-bearing ceramic molded body is arranged.

The process according to the invention thus' makes it possible to provide a β-SiC-molded body in which the energy expenditure in production is lower and wear and abrasion at the molding tools is reduced. In addition the porous β-SiC-molded body according to the invention has a very uniform surface and good adhesion properties for catalysts.

In accordance with the invention there is obtained a molded body which is excellently suitable as an effective catalyst carrier and/or diesel soot particle filter.

The present invention is to be described in greater detail by the Examples hereinafter but in no way limited thereby.

DETAILED DESCRIPTION OF THE INVENTION

Examples

Example 1

Figure 2:
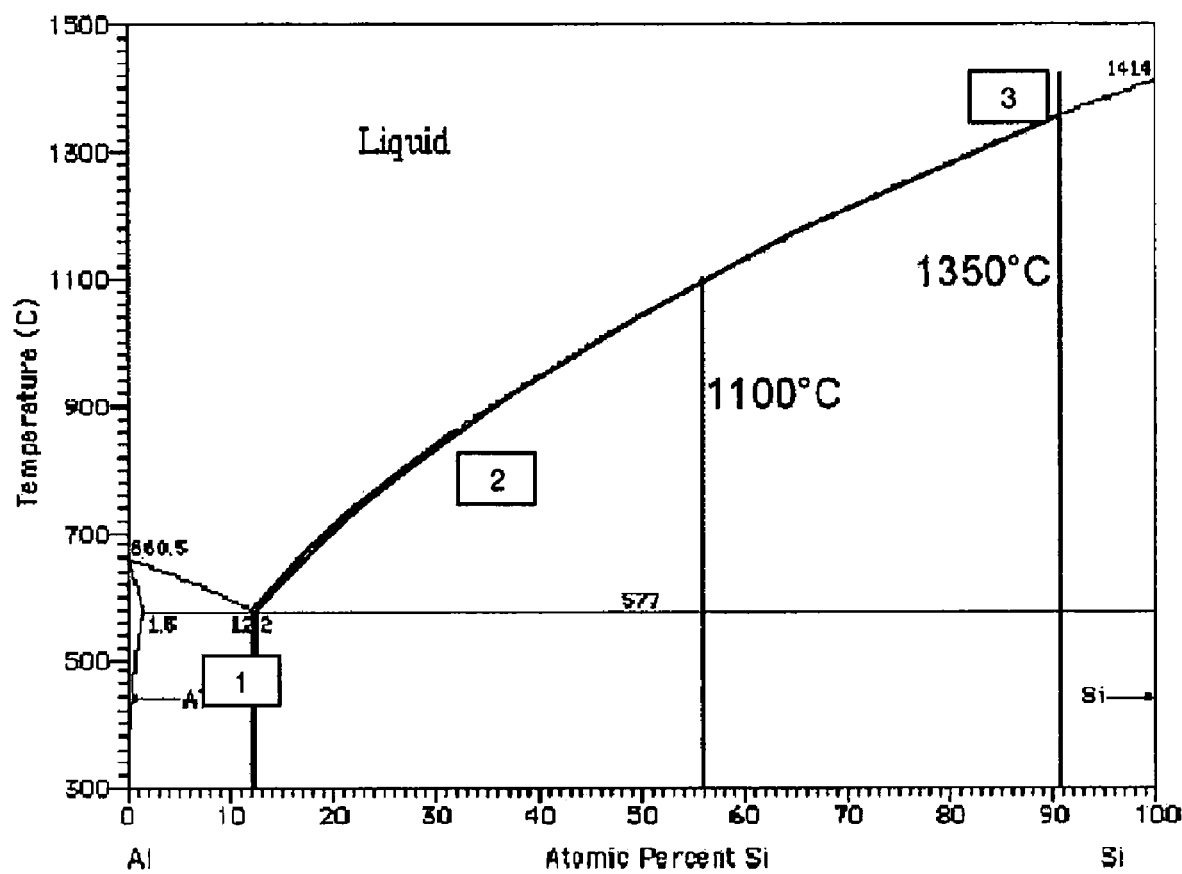
FIG. 2 shows the alloy formation of the silicon-aluminum melt during pyrolysis and silicating for a composition of 90 atomic % Si and 10 atomic % Al.

The melting point of aluminum is at about 660° C. The melting point of silicon is at about 1412° C. FIG. 2 shows for a composition with 90 atomic % Si and 10 atomic % Al alloy formation of aluminum and silicon at different temperatures during the pyrolysis and silicating operations.

During the first temperature procedure (pyrolysis) a eutectic melt involving the composition of 12.2 atomic % Si and 87.8 atomic % Al (point 1 in the diagram) is formed from 577° C. (eutectic point) at the Al—Si contact locations. If the temperature is further increased the melt is increasingly depleted in respect of Al as silicon additionally dissolves. At 850° C. (maximum temperature during pyrolysis in Example 1, point 2 in the diagram) there is theoretically a melt composition of about 33 atomic % Si and 67 atomic % Al. The proportion of Si in the melt however is much too low to permit SiC-formation. During the silicating operation the temperature is raised to a maximum of 1450° C. The proportion of silicon in the alloy increasingly rises with an increase in temperature. At point 3 in the diagram the melt theoretically involves a composition of 90 atomic % Si and 10 atomic % Al, that composition also precisely corresponds to the relationship of aluminum and silicon which was prepared for the starting material. Thus the complete Al and Si is in a molten condition. The proportion of silicon in the melt is now sufficiently high to permit silicating. During the silicating operation the alloy is increasingly depleted by the SiC-formation.

Example 2

Figure 1:
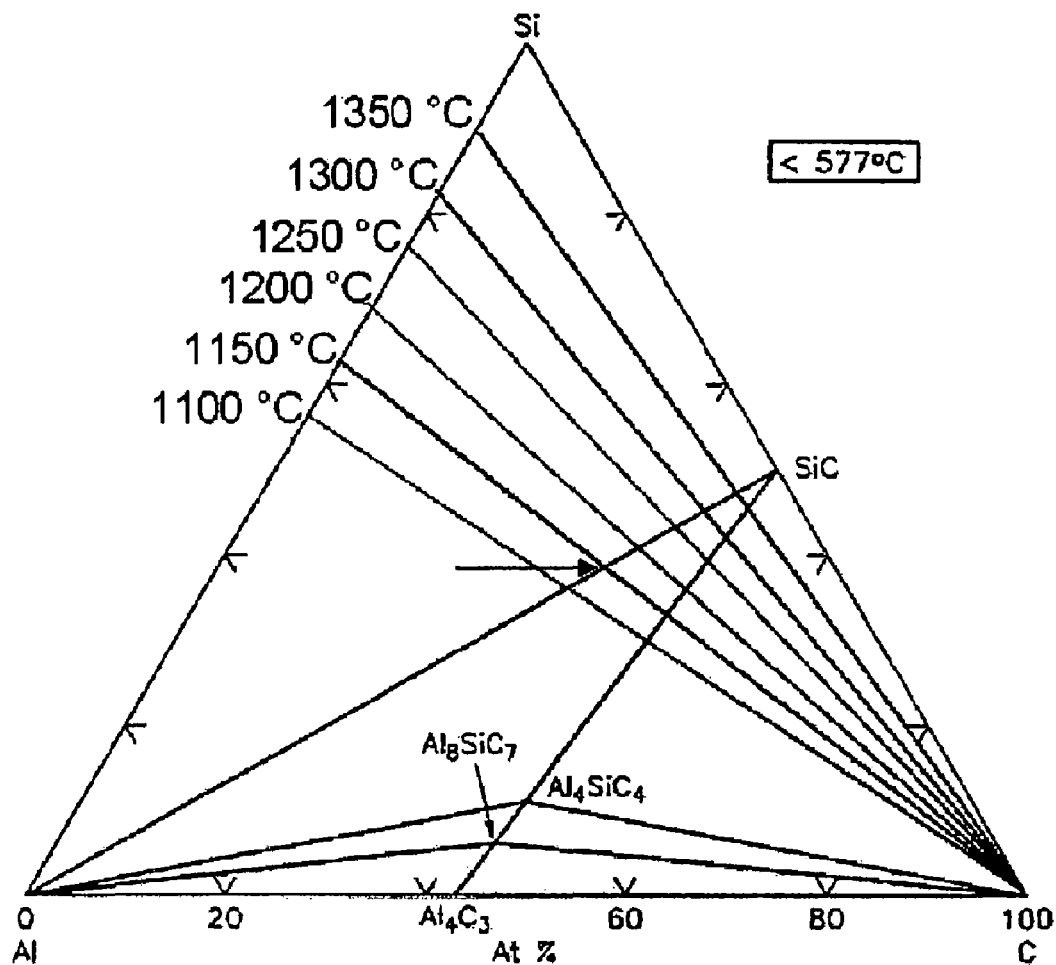
FIG. 1 shows the ternary Al—Si—C-phase diagram.

FIG. 1 and Table 1 show the ternary Al—Si—C-phase diagram and six possible alloy compositions. Table 1 gives the proportions in atomic %, Table 2 gives them in % by weight. If exactly those proportions are set, the respective melting points of the alloys and thus the corresponding silicating points are reached. The compositions of those alloys are within the Si—SiC—Al triangle, at the Al—SiC connecting line. In order to avoid the formation of the carbide $Al_4SiC_4$ that connecting line should not be exceeded in the direction of the SiC—$Al_4SiC_4$—Al triangle. If such a carbide were to be formed the mechanical strength of the filter fails greatly and distribution of the aluminum layer becomes less uniform. For that reason the selected proportions in Tables 1 and 2 are also just above that Al—SiC line.

TABLE 1

Composition of the possible AlSiC-alloys in atomic %

|  | Al | Si | C |
|---|---|---|---|
| 1100° C. | 28.1 | 36.5 | 35.4 |
| 1150° C. | 22.9 | 38.5 | 38.3 |
| 1200° C. | 18.5 | 41.0 | 40.5 |
| 1250° C. | 14.0 | 43.2 | 42.8 |
| 1300° C. | 10.3 | 45.1 | 44.6 |
| 1350° C. | 5.2 | 47.6 | 47.2 |

TABLE 2

Composition of the possible AlSiC-alloys in % by weight

|  | Al | Si | C |
|---|---|---|---|
| 1100° C. | 34.33% | 46.42% | 19.25% |
| 1150° C. | 28.61% | 50.08% | 21.30% |
| 1200° C. | 23.35% | 53.89% | 22.76% |
| 1250° C. | 17.94% | 57.64% | 24.42% |
| 1300° C. | 13.36% | 60.90% | 25.75% |
| 1350° C. | 6.86% | 65.41% | 27.73% |

Example 3

Taking the starting material, a honeycomb body with 200 cpsi was produced by extrusion, dried and pyrolyzed at 850° C. The pyrolyzed body was then heated In an argon atmosphere to 1250° C. or 1350° C. and kept at that temperature for 1 hour.

Embodiment 3a

| Composition of the starting material (in % by mass): | |
|---|---|
| Activated carbon 0-40 μm | 5.2% |
| Phenolic resin | 15.4% |
| Silicon powder 0-75 μm | 33.8% |

-continued

| | |
|---|---|
| Aluminum powder 0-50 μm flakes of 4 μm thickness | 14.4% |
| Cellulose ether | 2% |
| Water | 21% |
| Slip additive | 6% |
| Plasticizer | 1% |
| Soap | 1.2% |
| Composition after pyrolysis: | |
| Activated carbon | 8.28% |
| Glass carbon | 14.73% |
| Silicon | 53.99% |
| Aluminum | 23.00% |

The melting point of the alloy consisting of silicon and aluminum is 1200° C.

Embodiment 3b

Taking the starting material, a honeycomb body with 200 cpsi was produced by extrusion, dried and pyrolyzed at 850° C. The pyrolyzed body was then heated In an argon atmosphere to 1250° C. or 1350° C. and kept at that temperature for 1 hour.

| Composition of the starting material (in % by mass): | |
|---|---|
| Activated carbon 0-40 μm | 6.7% |
| Phenolic resin | 14.4% |
| Silicon powder 0-75 μm | 35.7% |
| Aluminum powder 0-50 μm flakes of 4 μm thickness | 7.6% |
| Cellulose ether | 2% |
| Water | 24% |
| Slip additive | 7% |
| Plasticizer | 1% |
| Soap | 1.6% |
| Composition after pyrolysis: | |
| Activated carbon | 11.32% |
| Glass carbon | 14.67% |
| Silicon | 61.01% |
| Aluminum | 13.00% |

The melting point of the alloy consisting of silicon and aluminum is 1300° C.

Embodiment 3c

Taking the starting material, a honeycomb body with 200 cpsi was produced by extrusion, dried and pyrolyzed at 850° C. The pyrolyzed body was then heated in an argon atmosphere to 1350° C. and kept at that temperature for 1 hour.

| Composition of the starting material (in % by mass): | |
|---|---|
| Activated carbon 0-40 μm | 6.7% |
| Phenolic resin | 14.4% |
| Silicon powder 0-75 μm | 35.7% |
| Aluminum powder 0-50 μm flakes of 4 μm thickness | 7.6% |
| Cellulose ether | 2% |
| Titanium hydride 0-63 μm | 0.5% |
| Water | 23% |
| Slip additive | 7.5% |
| Plasticizer | 1% |
| Soap | 1.6% |

| Composition after pyrolysis: | |
|---|---|
| Activated carbon | 11.29% |
| Glass carbon | 14.52% |
| Silicon | 60.50% |
| Aluminum | 12.91% |
| Titanium | 0.81% |

The melting point of the alloy consisting of silicon and aluminum is 1300° C.

Taking the starting material, a honeycomb body with 200 cpsi was produced by extrusion, dried and pyrolyzed at 850° C. The pyrolyzed body was then heated in an argon atmosphere to 1350° C. and kept at that temperature for 1 hour.

Figure 4A:
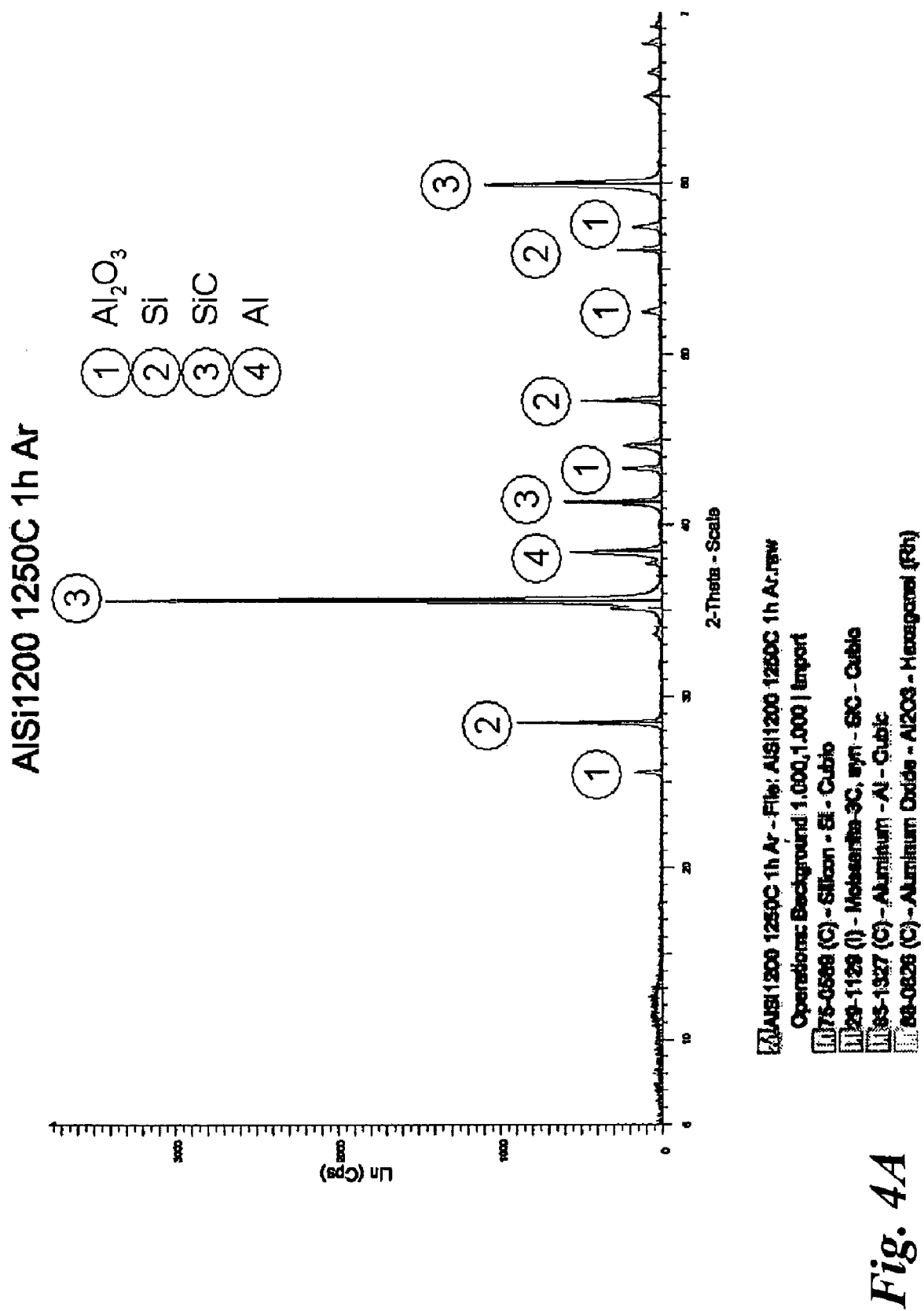
FIG. 4 shows XRD diagrams of the embodiments 3a (FIG. 4A) and 3b (FIG. 4B) for the silicating operation at 1250° C. and at 1350° C.
Figure 4B:
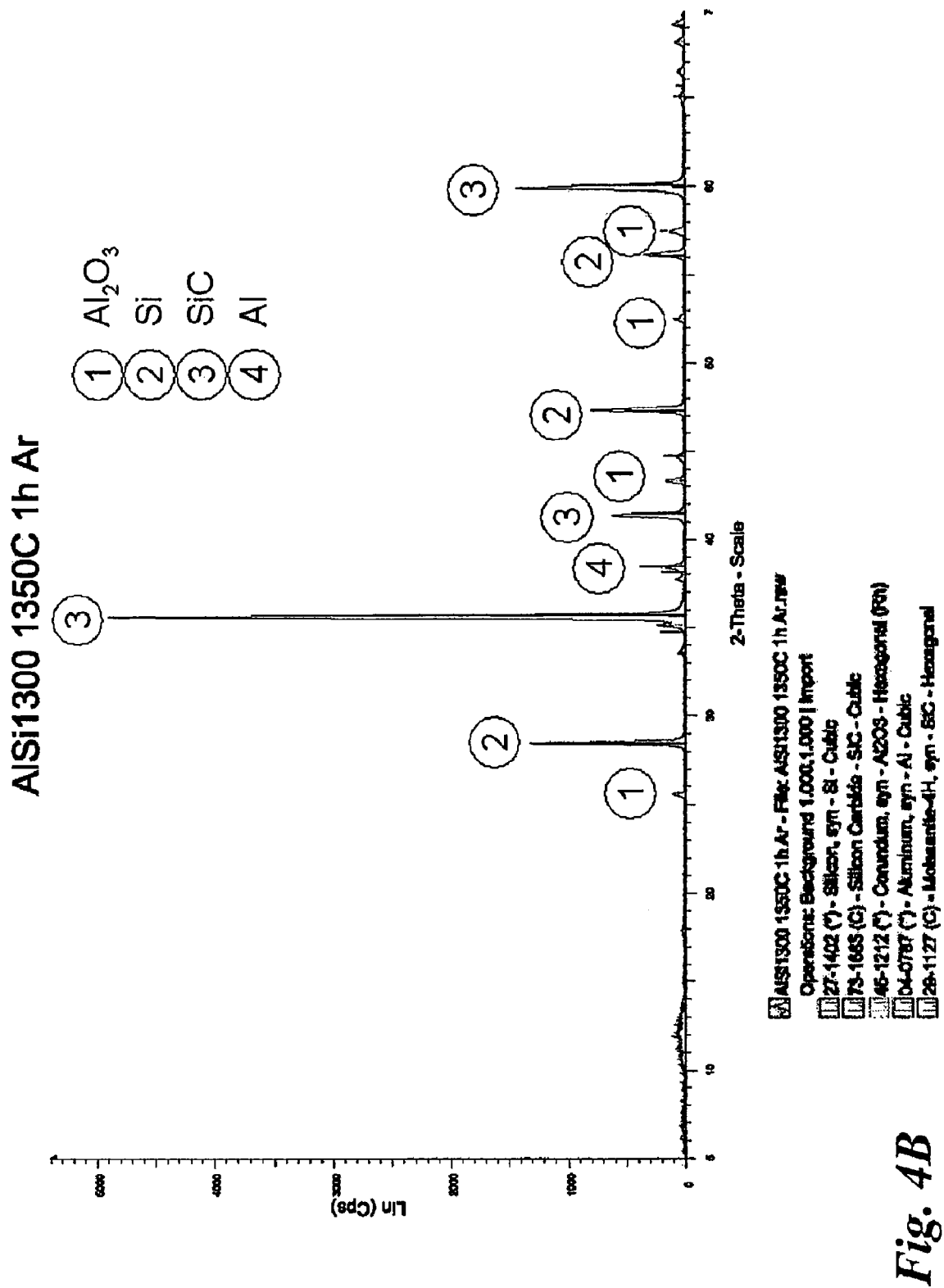
Figure 5:
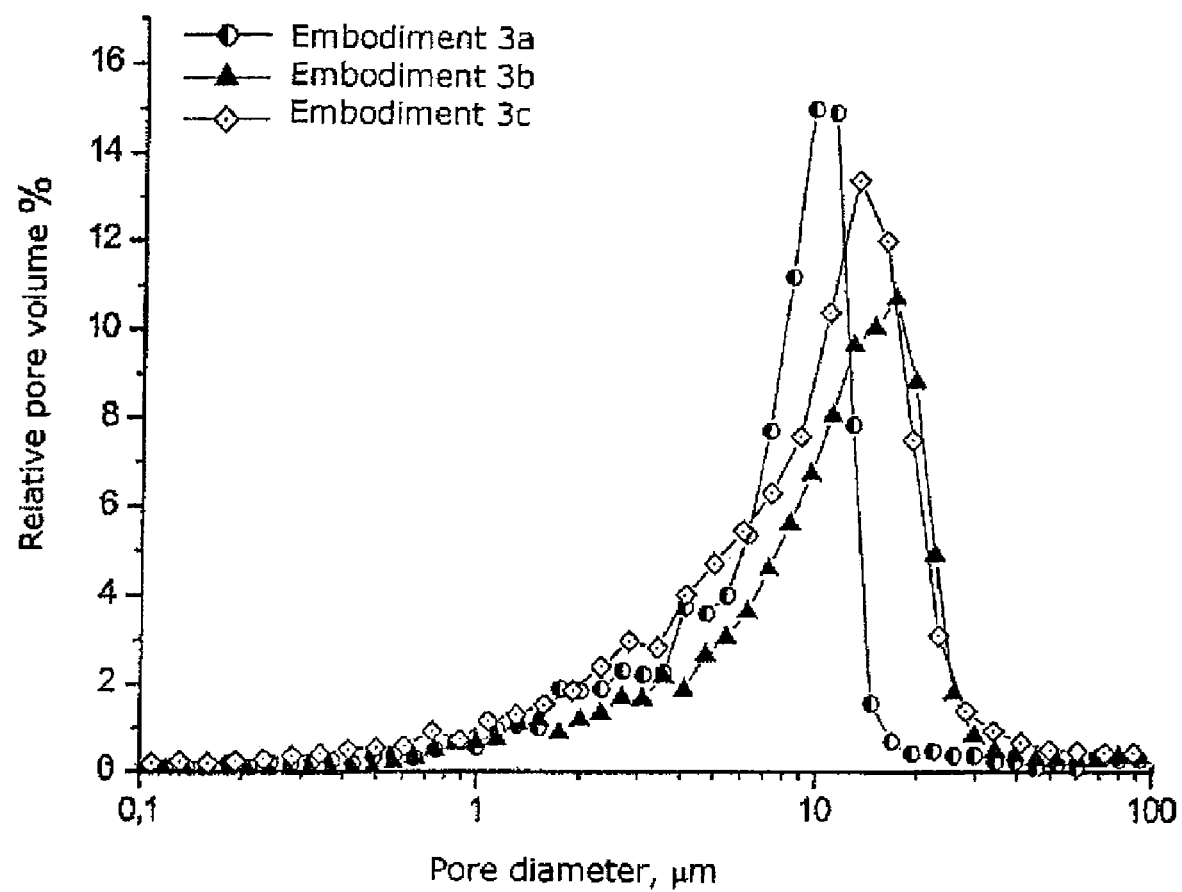
FIG. 5 shows the pore size distributions of the honeycomb bodies silicated at 1350° C. from Examples 3a and 3b and for the honeycomb from embodiment 3c.

FIG. 4 shows the XRD diagrams of embodiments 3a (FIG. 4A) and 3b (FIG. 4B), more specifically once for the silicating experiment at 1250° C. and once for the experiment at 1350° C. It can be clearly seen that a marked reaction to give SiC has already taken place even at 1250° C. FIG. 5 shows the pore size distributions of the honeycomb bodies silicated at 1350° C. from Examples 3a and 3b and that of the honeycomb from embodiment 3c. In all cases a porous SiC-structure has been formed, wherein a markedly smaller mean grain size has been set in the case of the higher proportion of aluminum in 3a.

Figure 6:
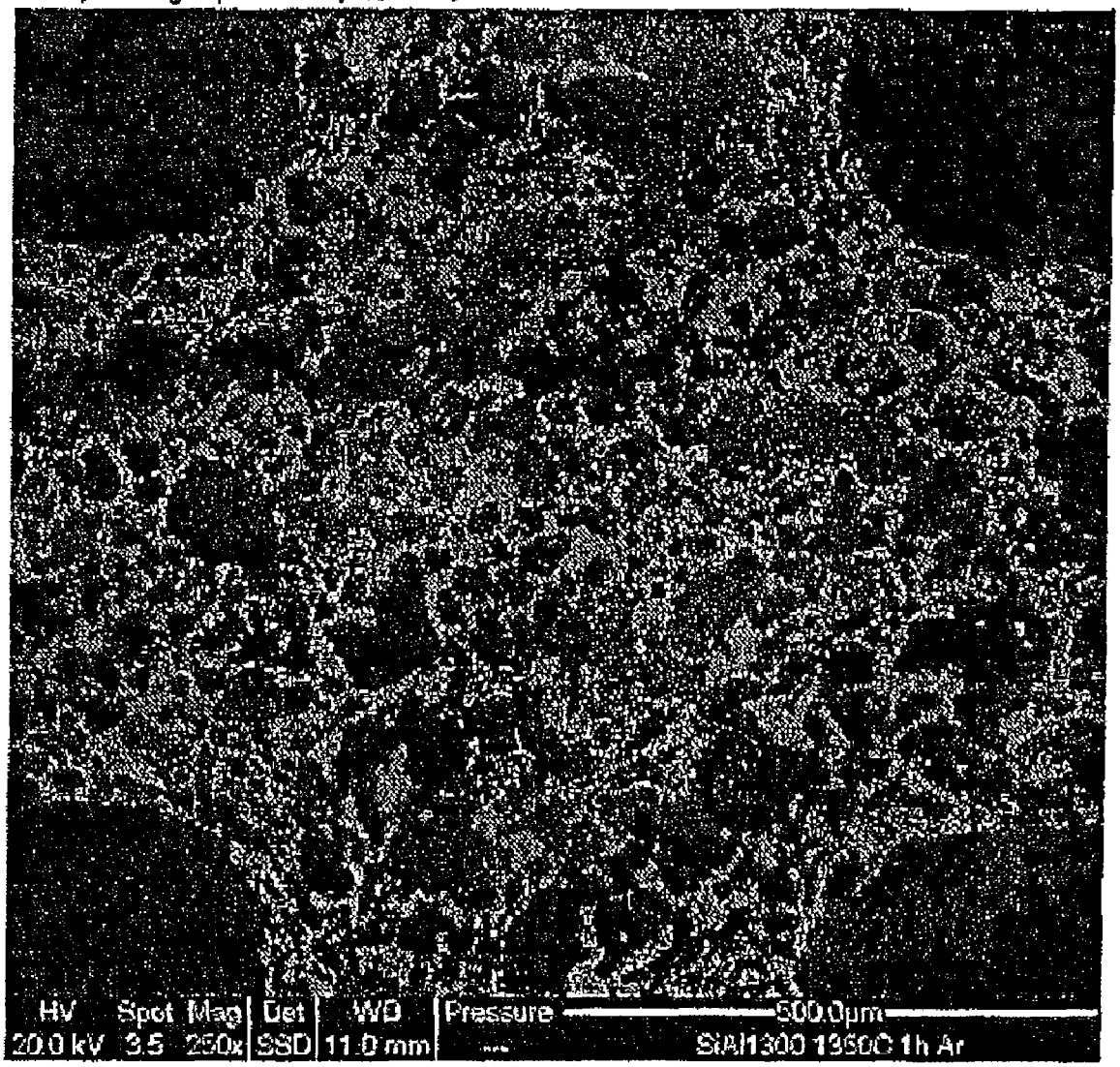
FIG. 6 shows the REM photograph of a ground section of a honeycomb from embodiment 3b which was silicated at 1350° C.

FIG. 6 shows the REM photograph of a ground section of a honeycomb from embodiment 3b which was silicated at 1350° C. It is possible to very clearly see the high porosity of the structure.

Figure 7:
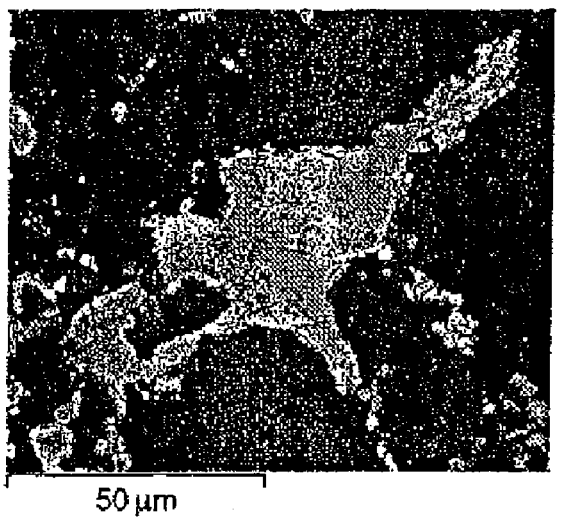
FIG. 7 shows of an image setting in the REM an element mapping for the embodiment 3b, silicated at 1350° C.
Figure 7:
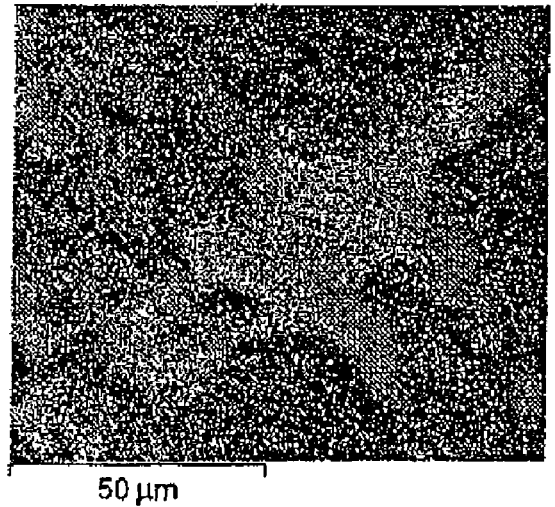
Figure 7:
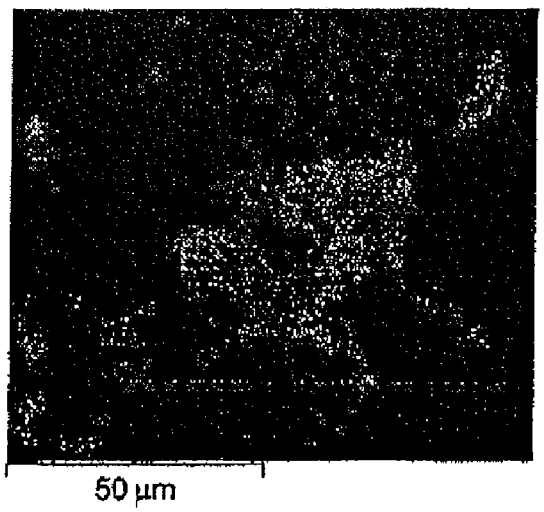
Figure 7:
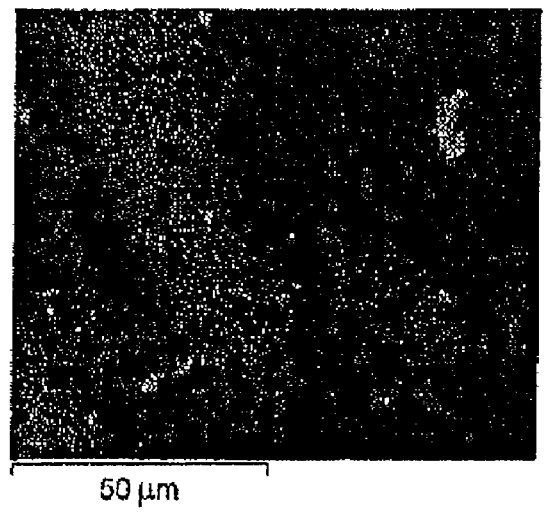

To represent the individual elements in the structure, an element mapping (for a description In this respect see Example 4) was implemented by an image setting in the REM. The result for embodiment 3b, silicated at 1350° C., is shown in FIG. 7. It is possible to see the actual image (1) as well as the mapping for carbon (2), silicon (3) and aluminum (4). In representations (2) through (4) the light regions represent those with a higher concentration of the element in question. Images (2) and (3) show the position of the SiC and image (4) shows the distribution of the aluminum thereon. The aluminum is clearly distributed in point form and not uniformly.

Figure 3:
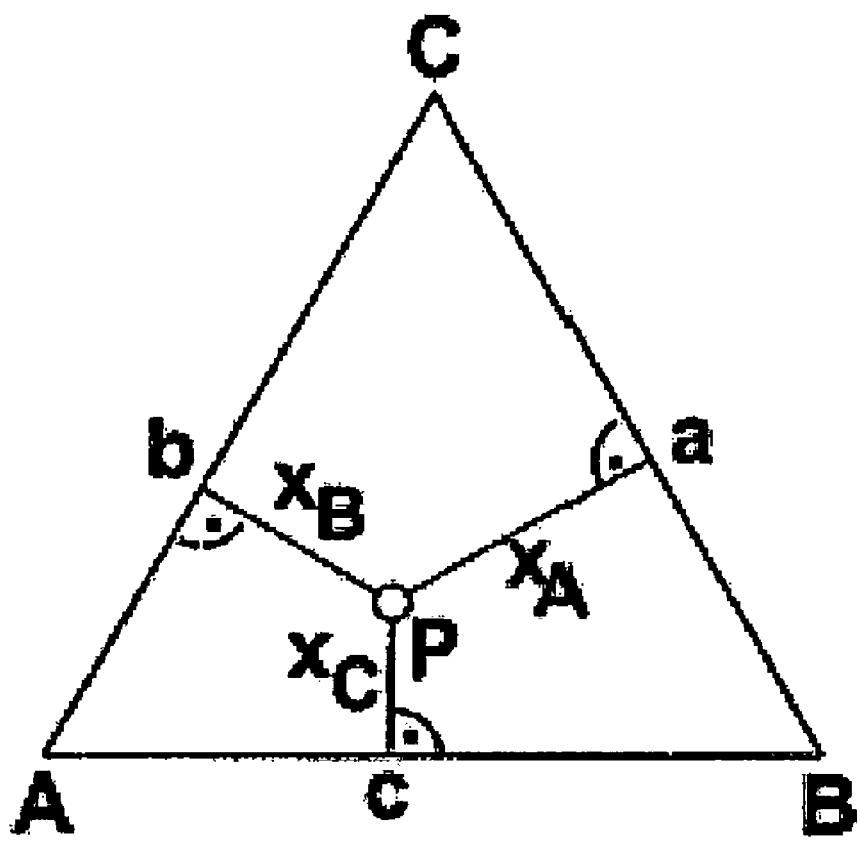
FIG. 3 describes the content triangle of a ternary phase diagram. Let A, B and C be the components of an alloy with the contents $X_A$, $X_B$, and $X_C$. For each point in the equilateral triangle the sum of the three distances from the sides is equal to the height of the triangle. The height of the triangle is made equal to 100% and the contents are calculated from the three distances.
Figure 8:
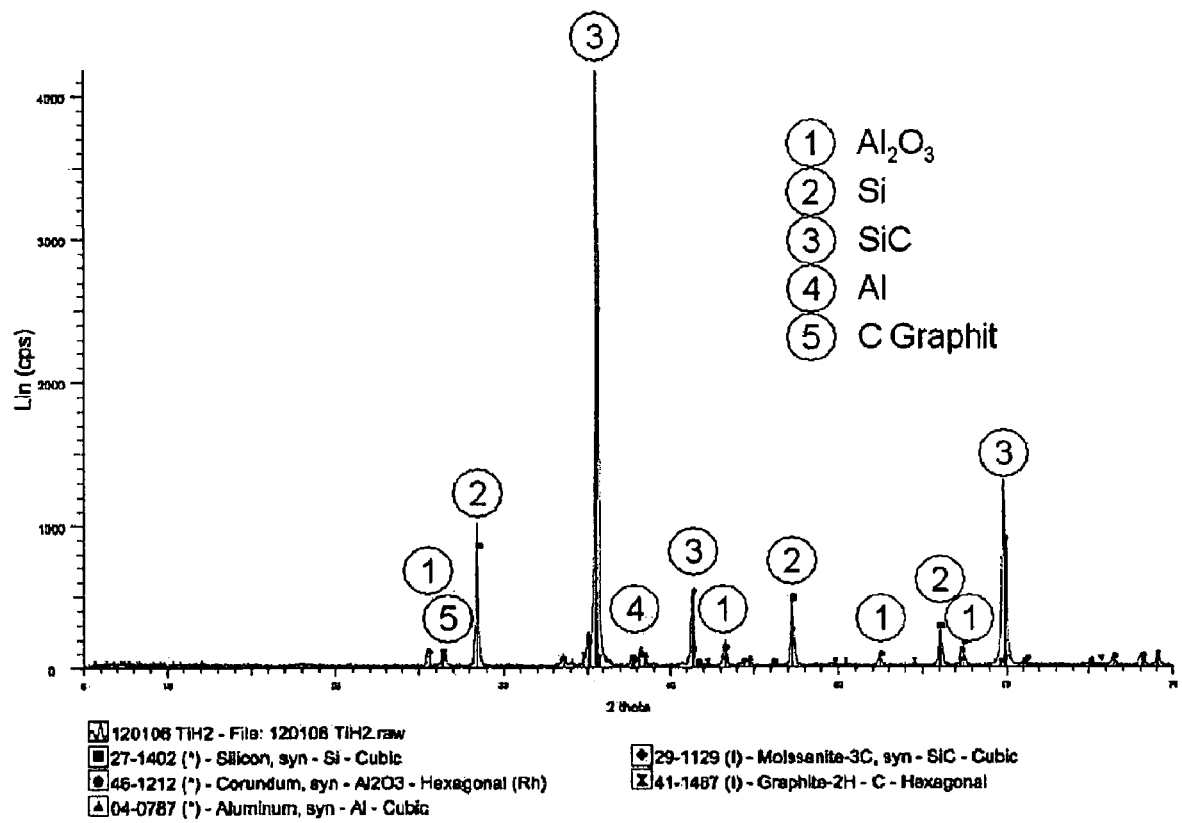
FIG. 8 shows the XRD diagram of embodiment 3c.
Figure 9:
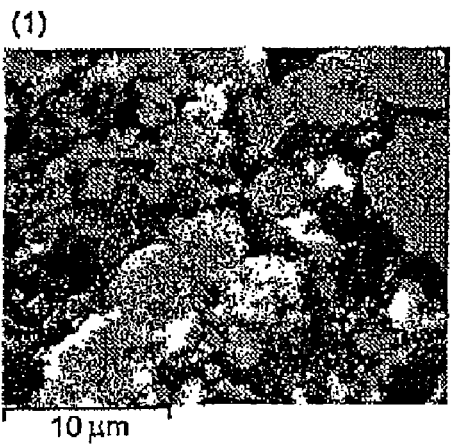
FIG. 9 shows the result of element mapping for embodiment 3c.
Figure 9:
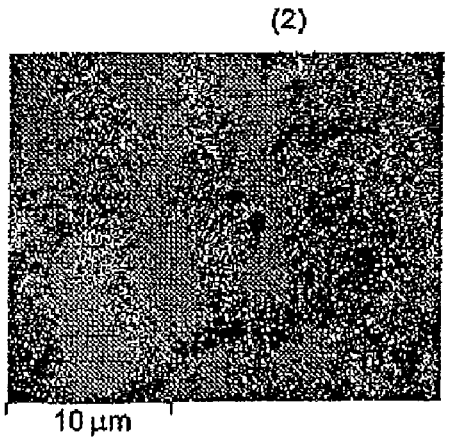
Figure 9:
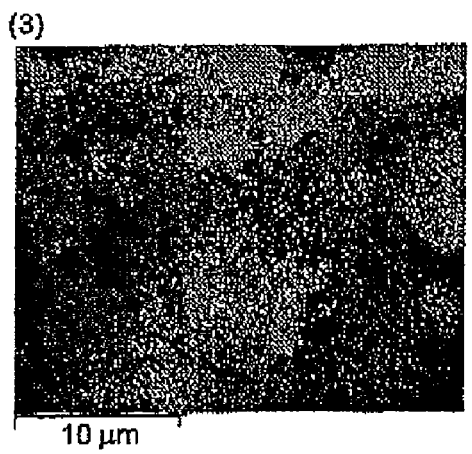
Figure 9:
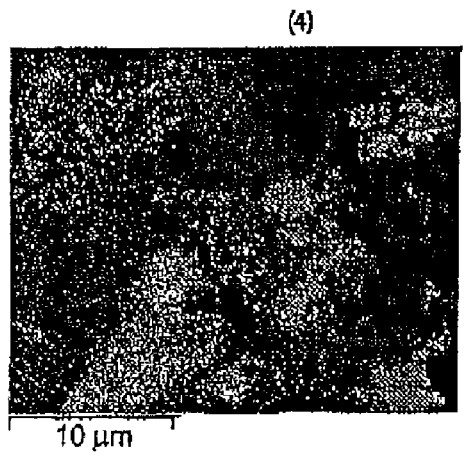
Figure 9:
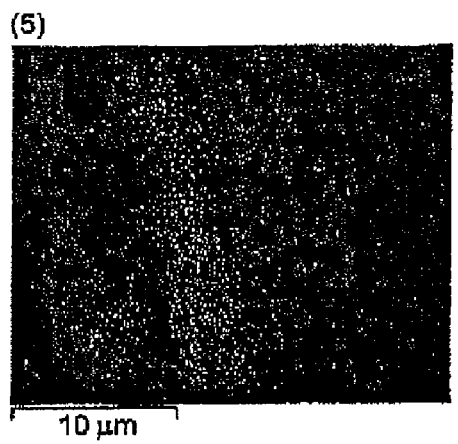

FIG. 8 shows the XRD diagram of embodiment 3c. It is not possible to see any significant difference in the reaction to give SiC in relation to embodiment 3b. The associated pore distribution is also illustrated in FIG. 3b. The situation involves a similar configuration to that with Example 3b. FIG. 9 shows the result of element mapping for embodiment 3c. The markedly uniform distribution of the aluminum over the SiC-surface can be seen here.

Example 4

Element Mapping by Means of Energy Dispersive X-Ray Radiation (EDX)

In the raster electron microscope the sample to be investigated is bombarded with very finely focused monoenergetic electrons. Those electrons in part penetrate deeply into the sample and can come into interaction with the shell electrons of atoms in deeper layers of the sample (to some micrometers). Different processes can be triggered thereby. One effect which occurs is that the electrons trigger X-ray radiation. In that respect a distinction is drawn between the X-ray bremsstrahlung (of no interest here) and the characteristic X-ray radiation. In the latter the energy of the radiation is characteristic of the atom from which the X-ray quantum was emitted. If the X-rays are separated with an energy spectrometer and their intensity measured at the respective energies, then the radiation energy in each case supplies the index for the kind of atom and the Intensity a measurement in respect of the concentration with which the kind of atom is represented in the analyzed sample layer a few micrometers thick.

That therefore gives:

Qualitatively: nature of the elements and positionally resolved distribution in the sample.

Quantitatively: concentration of the elements.

In the present case of element mapping an REM image portion is analyzed by means of EDX and a specific image represented for each individual element which occurs. The specific element is colored in on each image. That therefore gives an overview of the elements occurring, with their distributions.

What is claimed is:

1. A process for the production of a porous β-SiC-bearing ceramic molded body having a three-dimensional continuous β-SiC-structure, which has substantially no grain boundaries, the process including the steps of:
   (a) extruding a molded body from a material which includes silicon-bearing particles, carbon-bearing particles, aluminum-bearing particles and a cokable organic binding agent,
   (b) pyrolyzing the porous molded body produced in step (a) at a temperature of between 600 and 1000° C.,
   (c) silicating the porous molded body by heating to a temperature in a range of between 1100 and 1500° C. to obtain the porous β-SiC-bearing molded body which has an aluminum layer at the surface of the open pores and passages, and
   (d) oxidizing the aluminum layer from step (c) to produce an aluminum oxide layer.

2. The process as set forth in claim 1, wherein the aluminum-bearing particles are in flake form.

3. The process as set forth in claim 2, wherein the ratio of diameter to thickness of the aluminum flakes is at least 4.

4. The process as set forth in claim 2, wherein the flake-form aluminum-bearing particles are of a thickness in a range of between 0.01 and 14 μm and are of a mean particle diameter in a range of between 0.1 and 70 μm.

5. The process as set forth in claim 1, wherein the mixing ratio of the silicon-bearing, aluminum-bearing and carbon-bearing particles in the material of step (a) is selected such that no aluminum carbide and/or aluminum silicon carbide is formed.

6. The process as set forth in claim 1, wherein the silicon content is in a range of between 50 and 55 atomic percent with respect to the amount of silicon and carbon.

7. The process as set forth in claim 1, wherien the amount of aluminum with respect to the weight of the pyrolyzed body is in a range of between 1 and 35% by weight.

8. The process as set forth in claim 1, wherein the aluminum-bearing particles are coated with a protective layer.

9. The process as set forth in one of the preceding claims characterized in that the molded body is extruded into a passage-bearing structure with a passage density of between 50 and 400 passages/inch2 and passage walls of a thickness in a range of between 50 μm and 480 μm.

10. The process as set forth in claim 1, wherein the material extruded in step (a) further includes titanium, a titanium compound and/or a titanium alloy.

11. The process as set forth in claim 10, wherein the proportion of titanium is between 2 and 20% by weight with respect to the amount of the aluminum.

12. The process as set forth in claim 1, wherein a catalyst layer is applied to the aluminum oxide layer.

13. A porous β-SiC-bearing ceramic molded body comprising:
   a porous β-SiC-bearing molded body having a three-dimensional continuous β-SiC-structure, which has substantially no grain boundaries, the porous β-SiC-bearing ceramic molded body having pores of a mean pore size in the range of between 0.1 μm and 50 μm and an aluminum oxide layer at the surface of the open pores and passages.

14. The porous β-SiC-bearing ceramic molded body as set forth in claim 13, wherein between 55% and 70% of the surface of the open pores and passages are continuously covered with the aluminum oxide layer.

15. The porous β-SiC-bearing ceramic molded body as set forth in claim 13, wherein the porous β-SiC-bearing ceramic molded body includes between 0 and 10% by weight of silicon with respect to the total weight of β-SiC-bearing molded body.

16. The porous β-SiC-bearing ceramic molded body as set forth in claim 13, wherein the porous β-SiC-bearing ceramic molded body includes
   between 60 and 95% by weight of β-SiC,
   between 0 and 10% by weight of Si, and
   between 1 and 30% by weight of Al,
   wherein the respective amounts in % by weight relate to the total weight of the β-SiC-bearing molded body and including any further components, add up to 100% by weight.

17. The porous β-SiC-bearing ceramic molded body as set forth in claim 13, wherein the aluminum oxide layer further includes titanium, a titanium compound and/or a titanium alloy.

18. The porous β-SiC-bearing ceramic molded body as set forth in claim 17, wherein the proportion of titanium is between 2 and 20% by weight with respect to the amount of the aluminum.

19. The porous β-SiC-bearing ceramic molded body as set forth in claim 13, wherein the porous β-SiC-bearing ceramic molded body has a passage-bearing structure with a passage density of between 50 and 400 passages/inch2 and with passage walls of a thickness in a range of between 50 μm and 480 μm.

20. The porous β-SiC-bearing ceramic molded body as set forth in claim 13, wherein the β-SiC-bearing molded body is a catalyst carrier and/or a diesel soot filter.

21. The porous β-SiC-bearing ceramic molded body as set forth in claim 13, wherein a catalyst layer is arranged on the aluminum oxide layer.

22. A catalyst system comprising:
   a porous β-SiC-bearing ceramic molded body having a three-dimensional continuous β-SiC-structure, which has substantially no grain boundaries, the porous β-SiC-bearing ceramic molded body having pores of a mean pore size in the range of between 0.1 μm and 50 μm and an aluminum oxide layer at the surface of the open pores and passages.

23. The porous β-SiC-bearing ceramic molded body as set forth in claim 16, wherein the porous β-SiC-bearing ceramic molded body includes;
   between 60 and 70% by weight of β-SiC,
   between 0 and 5% by weight of Si, and
   between 5 and 20% by weight of Al,
   wherein the respective amounts in % by weight relate to the total weight of the β-SiC-bearing molded body and including any further components, add up to 100% by weight.

* * * * *